July 31, 1945. E. KRIMSKY 2,380,850
BINOCULAR INSTRUMENT
Filed Oct. 16, 1942 2 Sheets-Sheet 1

Inventor:
EMANUEL KRIMSKY
By Raymond Jones,
Attorney.

July 31, 1945. E. KRIMSKY 2,380,850
BINOCULAR INSTRUMENT
Filed Oct. 16, 1942 2 Sheets-Sheet 2
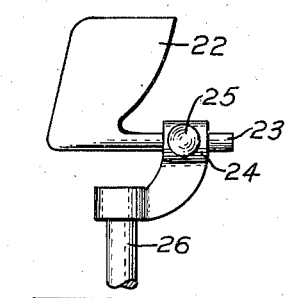
FIG. 2
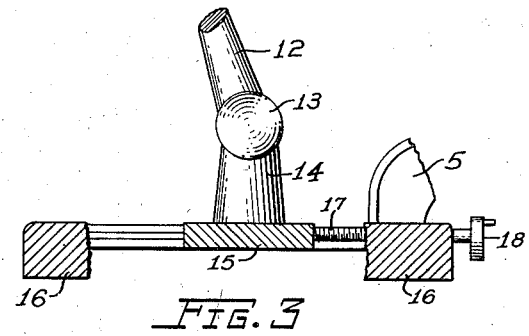
FIG. 3
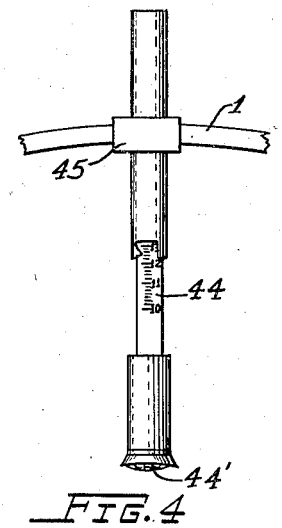
FIG. 4
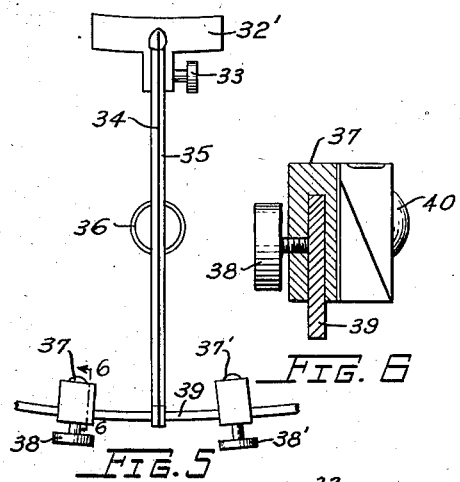
FIG. 5
FIG. 6
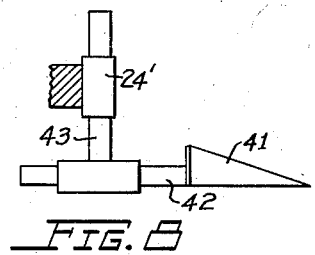
FIG. 8
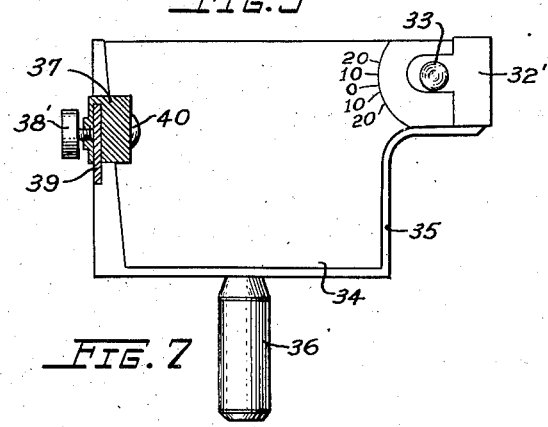
FIG. 7
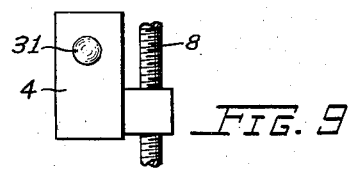
FIG. 9
Inventor:
EMANUEL KRIMSKY
By Raymond Jones
Attorney.

Patented July 31, 1945

2,380,850

UNITED STATES PATENT OFFICE 2,380,850

BINOCULAR INSTRUMENT

Emanuel Krimsky, Brooklyn, N. Y.

Application October 16, 1942, Serial No. 462,314

7 Claims. (Cl. 88—20)

The present invention relates to an anglometer and, more particularly, to an optical instrument adapted to measure the status of the ocular muscles either in a primary position or in any selected direction of gaze preferably at a distance of 13 inches from the eyes.

The main object of this invention is to provide a binocular instrument that has means to measure the amount of turning-in or turning-out of the eye of a patient, or in other words, to measure the angle of "squint" of the eye of a patient. Broadly, this measurement is made by means of a pair of light targets slidably arranged on a graduated arc whereby the examiner may project or center a ray of light on one or both eyes of the patient.

Another object is to provide a light carrying arc that may be displaced upwardly or downwardly in a manner to permit measurements, at a selective position of gaze, of the angle in degrees that an eye may deviate up or down as well as in or out.

Another object is to provide, in an anglometer, a head-rest that has means to permit the same to be tilted laterally whereby to accommodate the head-rest to the head-tilt of the patient when measurements are to be taken with the head of the patient in a tilted position.

In the drawings:

Fig. 2 is a detail view of the chin-rest element;

Fig. 3 is a broken view in section on line 3—3 of Fig. 1;

Fig. 4 is a detail view of a telescopic rod element;

Fig. 5 is a plan view of a modified form;

Fig. 6 is an enlarged sectional view on line 6—6 of Fig. 5;

Fig. 7 is a view in side elevation of the device shown in Fig. 5;

Fig. 8 is a detailed view of a wedge prism support;

Fig. 9 is a detailed view of a light support shown in Fig. 1; and

Fig. 10 shows the wiring diagram for the lamps 4, 4' and 32.

Figure 1:
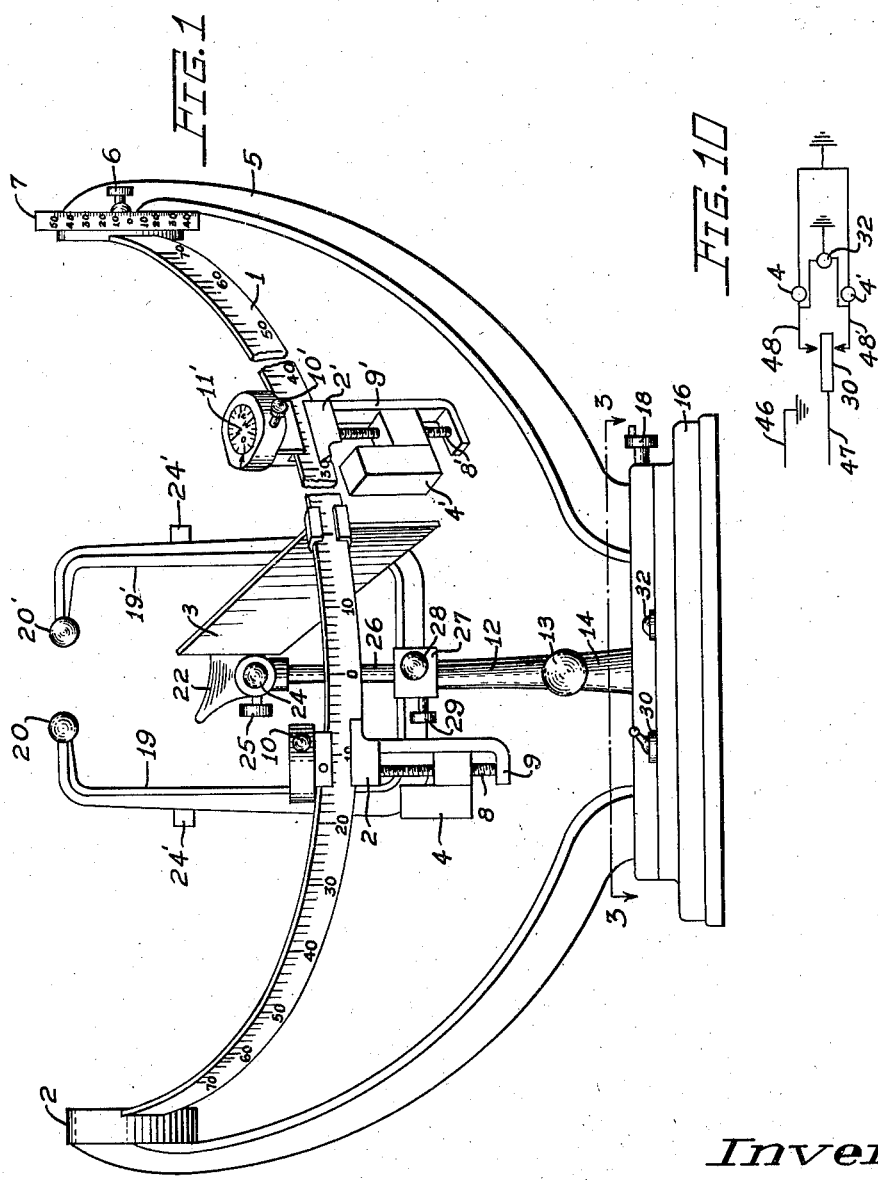
Fig. 1 is a view in side elevation partly broken away of the assembled apparatus.

Referring to the drawings in detail, the anglometer comprises as main or essential elements an arcuate bar 1, a pair of light supports 2—2' that are mounted to slide on the arcuate bar 1 and a septum 3 also mounted to slide on the bar 1. The supports 2—2' carry, respectively, light sources 4—4' that are adjustable up and down selectively.

The bar 1 is pivotally supported on a yoke 5 in a manner to be adjusted above or below a horizontal plane. Such adjustments are made by turning a knob 6. The knob shaft and the arc trunnion carry interengaging gears in a well-known manner to permit swing of the arc when the knob 6 is rotated. A scale 7 is provided on the trunnion bearing to indicate angular displacement of the bar 1 in degrees.

The light sources or targets 4—4' are, respectively, supported on and may be adjusted up or down by threaded rods 8—8' that are rotatable in brackets 9—9'. Such adjustment is obtained by knobs 10—10', the shafts of which are geared in a well-known manner to the rods 8—8'. The degree of elevation of the light sources is indicated by means of the scales 11 that are rotated in proportion to rotation of the rods 8—8'.

A head-rest 12 is pivoted at 13 to a standard 14. As shown in detail in Fig. 3, the standard 14 is formed integral with a cross-head 15 that is slidable on the main base 16. A screw threaded rod 17 threadably engaged with the base 16 is secured to the cross-head 15 and is rotated by a hand wheel 18 to shift the entire head-rest laterally.

The head-rest comprises a pair of standards 19—19' that terminate in temple positioning plates 20—20'. The head-rest also carries a chin-rest plate 22. As shown in Fig. 2, the plate 22 has an extension rod 23 that is adjustably carried in a sleeve 24 and may be clamped therein by a set screw 25. A chin-rest support rod 26 extends upwardly from the head-rest 12 and the rod 26 is movable up or down by being slidably supported in a block 27. A control knob and shaft 28 is geared to the rod 26 by a common form of rack and pinion engagement. A set screw 29 serves to lock the rod 26 in any position desired.

A flasher switch 30 of the tumbler type is provided to permit alternate illumination or selective flashing of the light sources 4—4'. Fig. 9 shows a lens 31 on the rear side of a light source from which the light ray is projected. A pilot light 32 is used to indicate when one or the other of the lights 4—4' is illuminated.

A modified or more simple form of the invention is shown in Figs. 5, 6 and 8. This form comprises all of the basically novel and essential elements that have been described and shown in Fig. 1. A plate or member 32' is adjustably pivoted by means of a set screw 33 on a frame 35. This frame carries a septum 34 and a handle 36 is attached to the frame 35. A pair of light supports 37—37' is slidably supported on an arcuate bar 39 and these light supports may be set at any desired position on the bar 39 by means of set screws 38—38'. The light rays are projected from a respective light support through a lens 40.

In Fig. 7 is shown a wedge prism support that may be used when desired. A pair of prism supports 24' is carried by the standards 19—19'. A prism 41, supported on a rod 42 which is adjustably supported in a sleeve 43 which, in turn, is adjustably mounted in a respective support 24'.

Fig. 4 shows a detail view of a telescopic rod 44 that may be adjustably mounted on the bar 1 by means of slide block 45. This telescopic rod is provided with a light source 44'. The calibrations shown are based on the distance of the end of the rod or rule from the base line joining the ends of the bar 1.

Referring to Fig. 10, one conductor 46 is shown as grounded to the frame of the device. The other conductor 47 is connected to the switch 30 and this switch may selectively connect to conductors 48—48' that are in series with the lamps 4—4'. The other side of each lamp is grounded to the frame. The pilot light 32 is connected on one side to each conductor 48—48' and, on the other side is also grounded to the frame. Each conductor 48—48' leads to a respective light 4—4'.

Two eyes that focus normally on a single point or light are each receiving duplicate images on corresponding fixed points on the respective eyes. If one aims to dislocate an eye as, for example, by pressing on one eyeball that single point of light will appear doubled due to the fact that it no longer strikes the corresponding points of the film or retinal surfaces of the two eyes. This explains why certain persons who have recently developed cross-eyes after injury or disease complain of double vision. In more chronic cases (or advanced) of cross-eye, certain changes take place in this disturbing relationship of the eyes and the patient may no longer see double. This does not imply that his eyes are co-ordinating properly.

Even normal persons may show a latent form of cross-eyes. The reason why normal eyes are not crossed is because they automatically adjust themselves to stresses and strains involved in converging the eyes for near and in keeping them straight when looking into the distance. We can demonstrate the effort required to maintain binocular vision by merely covering one eye and allowing the subject to look at a light at, say, 13 inch reading distance with his uncovered eye. It will be found that the covered eye often changes its focus so that its visual axis if it could be projected through the cover would no longer meet with or coincide with the axis of the non-covered or fixing eye at the point source of light. The position which such an eye assumes varies in different persons. In some people, the eye behind the cover will turn out; in others, it will turn in; and in still others, it will remain stationary. Also, if such a cover or screen now be transferred to the other eye, the response will be identical in nature. This phenomenon is easy to observe without an instrument by simply holding a light in one hand and moving a screen slowly from one eye to the other. As either eye is uncovered alternately, that eye from which cover is removed will be seen to move into the line of fixation so as to see the light. The significance of such a response varies in different people, and the amount of turning of the eye behind the cover or the excursion required to bring it into line when such cover is removed helps the examiner to decide in conjunction with other findings whether it is or is not serious.

From the standpoint of the examiner, it is not enough to merely see such latent or obvious squint (cross-eye). He must also measure the amount of turning-in or turning-out of the eye depending on the case. By covering one eye, we are handicapped because we can see only one eye at a time. We can, however, repeat this test by simply placing a partition or septum between both eyes and holding a light on one side of the partition. With such an arrangement, but one eye can see the light similar to the previous instance where one eye is actually covered, but with the advantage that the examiner can see what happens to the other eye while the light is directed to the fellow eye. It is not only possible to see a non-fixing eye turn out, but we can also direct another light to corneal fixation point of that eye as a result of which the two lights or images would be fused into one. As the examiner moves the light or lights until they are centered on both corneae, the images will be seen to merge into a single or fused image by virtue of the fact that these lights are in the lines of the visual axes of both eyes. It also indicates that even though a septum separates the eyes, the seeing of single means that the corresponding points of the retinal or film surface of the eye have been struck much like the single image resulting from both eyes looking on a single point. In other words, we interpret the nature of a binocular response in term of the point or points on the back of the eye where such points register. When the doctor places a partition between the eyes, he can see when one eye appears to turn in or to turn out relative to the other. If both eyes remain stationary or still meet proximal to the same common point on opposite points of this partition, we assume that no latent deviation exists because they would remain the same if the partition were removed. And two light points placed flush against opposite points of this septum will strike the center of each cornea. Also, if each light is flashed alternately on and off, the eyes will not move and appear to remain fixed at the position at which such reflexes are centered on the cornea. However, if one eye turns out when a partition is interposed, these two lights will no longer strike the fixation points both corneae and the images will appear separated (crossed) rather than touching as in the previous case where the lights are placed in proper alignment, and the targets will have to be separated to strike the fixation points of the corneae.

In the operation of the instrument, the patient is positioned with his chin against the chin-rest 22 and with the temples in contact with the temple supports 20—20'. In this position, the eyes of the patient are spaced about thirteen inches from the light supports. The examiner brings the septum first in a straight or antero-posterior position. A light 4 is directed into one eye and will be seen to strike the fixation point of the cornea as that eye fixes the light. The other light 4', which is on the other side of the septum, is also shifted until it also produces a central light reflex on the corresponding eye. When the lights appear to be centered, each light is flashed alternately by means of the switch 30. This serves a two-fold purpose, it serves to awaken an eye that suppresses and also enables one to judge whether the angle separating the two targets (or the two eyes) is correct for, in addition to centering the corneal light reflexes, the eyes should reach a stationary position if made to look alternately at one light and then the other light. From the standpoint of the patient, it also means that, at this proper angle, he is seeing these separate images merge even though they are actually separated. By reading the calibrated bar 1 at each position of the light supports, the examiner can determine the angle of latent or actual deviation.

The anglometer shown also provides for displacement of the bar 1 through a calibrated selective position of gaze upwards or downwards. The bar 1 may be moved above or below a horizontal plane and the angular displacement may be read from the scale 7. By reading the positions of the light supports on the bar 1 and the vertical displacement in degrees of this bar, it may readily be determined how many degrees the patient is looking up and to the right or looking up and to the left. This is a very important feature of the anglometer shown because some persons may look up and to the right but not very much. The measurements can be easily transferred to or plotted on a simple graph. In one direction of gaze, the eyes may appear straight, whereas in another position, they may appear turned in. It is important to measure and to record such findings in clear terms in order to interpret improvement or other changes.

Each light support is adjustable up or down by means of its adjusting knob 10 which rotates the screw 8. The excursion up or down of each light support is read in degrees on the respective scale 11. In some instances, an eye may turn up as well as out and one problem, therefore, is to bring the light in line with the fixation points of both corneae and this necessity may entail vertical as well as horizontal adjustments of the light supports or targets.

The entire head-rest 19—19' may be tilted to the left or right due to the pivotal connection between the standard 12 and the base 14, the screw 13 serving to lock the head-rest in any desired position. Some persons may have a head-tilt to avoid seeing double when the head is straightened out. The head-rest shown may be set at a position at which the head-tilt of the patient is comfortable for seeing objects single. By such a flexible arrangement, one may compare the findings on this comprehensive instrument with the head tilted and tested in such a position as well as in an upright position. If the eyes respond well when the head is straightened, it suggests that they are not at fault in leading to this head-tilt and another cause must be sought.

The telescopic rod 44 may readily be slipped on and off the bar 1. The rod is first adjusted so as to be farthest away from the eyes and, as this telescopic device is drawn out, the light comes nearer and nearer to the eyes and the examiner sees the eyes turning or converging with the corneal light reflexes remaining central. The limit of such convergence can be determined when one eye gives way and thereby turns out, thus displacing reflex off center. The reading showing the limit of convergence is then read off on the telescopic rod and recorded.

This convergence rule is a very desirable feature and is a distinct improvement over any other rule on the market. The calibrations on the telescopic rod are based on the distance of the end of the rod or rule from the diameter or base line connecting the ends of the bar 1. It is common practice for an examiner to place an ordinary rule against either cheek and bring a pin or light along the rule and then figure the distance from the cheek bone to the center of rotation of the eyeball. In my instrument, no such computations are necessary because the calibrations are based on the distance from the base line which joins the ends of the bar 1, hence the measurements correspond closely to the centers of rotation of the eyeballs.

I claim:

1. In an optical instrument, a base, an arcuate member carried on said base, a pair of light supports slidably positioned on said member, a light source on each support, means for moving the light sources vertically on the respective supports the light from each source being directed towards a respective eye of a patient positioned rearwardly of said arcuate member, means for pivotally supporting the ends of said arcuate member so as to permit the light supports to be swung up or down in unison and means on said base for positioning the head of a patient.

2. In an instrument as set forth in claim 1, wherein each light support is provided with a light bulb, and means for selectively illuminating said light bulbs.

3. In an instrument as set forth in claim 1, a two-part telescopic rod carried by the arcuate member, a light source on one end of said rod, said light source and its associated rod part being adjustable towards an eye to be tested, and scale indicia on said rod for indicating the distance of the light source from the eye under test.

4. In an instrument as set forth in claim 1, a septum postioned between the light supports and being adjustably mounted for sliding movement along the arcuate member.

5. In an instrument as set forth in claim 1 wherein the means for positioning the head of a patient comprises a standard having a head rest and a chain rest thereon, and means for shifting said standard laterally along the base in a plane parallel to the plane of the light supports.

6. In an instrument as set forth in claim 1, an arcuate scale mounted adjacent one pivotal point of the arcuate scale member for indicating the positions of the member above and below a horizontal plane.

7. In an optical instrument, a base, a pair of standards mounted on the base, an arcuate member, pivots on the free ends of the standards engaging the respective ends of the member for supporting the member to swing to positions above and below a horizontal plane, an arcuate scale mounted adjacent one pivotal point of the member for indicating angular movement thereof, a pair of light supports adjustably supported on said arcuate member and being movable therealong, a light source on each support, means for adjustably supporting each light source on a respective support and means for moving each light source in a vertical plane on its support.

EMANUEL KRIMSKY.